United States Patent
Audenaert et al.

(10) Patent No.: US 7,722,955 B2
(45) Date of Patent: May 25, 2010

(54) FLOORING SUBSTRATE HAVING A COATING OF A CURABLE COMPOSITION

(75) Inventors: Frans A. Audenaert, Kaprijke (BE); Rudolf J. Dams, Antwerp (BE); Zai-Ming Qiu, Woodbury, MN (US); Naiyong Jing, Woodbury, MN (US); Thomas P. Klun, Lakeland, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1066 days.

(21) Appl. No.: 11/279,657

(22) Filed: Apr. 13, 2006

(65) Prior Publication Data

US 2007/0243389 A1  Oct. 18, 2007

(51) Int. Cl.
  *B32B 27/40* (2006.01)
(52) U.S. Cl. .................................... 428/423.1; 428/422
(58) Field of Classification Search ................ 428/422, 428/423.1; 528/44
See application file for complete search history.

(56) References Cited

U.S. PATENT DOCUMENTS

| | | | |
|---|---|---|---|
| 4,262,072 A | 4/1981 | Wendling et al. | |
| 4,612,356 A | 9/1986 | Falk | |
| 4,614,667 A | 9/1986 | Larson et al. | |
| 4,778,915 A | 10/1988 | Lina et al. | |
| 4,885,332 A | 12/1989 | Bilkadi | |
| 4,920,190 A | 4/1990 | Lina et al. | |
| 4,960,543 A | 10/1990 | Wehowsky et al. | |
| 4,985,473 A | 1/1991 | Williams et al. | |
| 5,216,097 A | 6/1993 | Allewaert et al. | |
| 5,623,037 A | 4/1997 | Simeone et al. | |
| 5,677,050 A | 10/1997 | Bilkadi et al. | |
| 6,132,861 A | 10/2000 | Kang et al. | |
| 6,238,798 B1 | 5/2001 | Kang et al. | |
| 6,239,247 B1 | 5/2001 | Allewaert et al. | |
| 6,245,833 B1 | 6/2001 | Kang et al. | |
| 6,391,459 B1 | 5/2002 | Szum et al. | |
| 6,646,088 B2 * | 11/2003 | Fan et al. ................... | 528/30 |
| 6,660,338 B1 | 12/2003 | Hargreaves | |
| 6,660,389 B2 | 12/2003 | Liu et al. | |
| 6,680,118 B2 | 1/2004 | Szum et al. | |
| 6,790,924 B2 | 9/2004 | Anton et al. | |
| 6,803,109 B2 * | 10/2004 | Qiu et al. ................... | 428/423.1 |
| 7,094,829 B2 | 8/2006 | Audenaert et al. | |
| 2003/0105263 A1 | 6/2003 | Fan et al. | |
| 2004/0077238 A1 | 4/2004 | Audenaert et al. | |
| 2005/0072336 A1 | 4/2005 | Itoh et al. | |
| 2005/0096244 A1 | 5/2005 | Audenaert et al. | |
| 2005/0137355 A1 | 6/2005 | Buckanin et al. | |
| 2005/0249942 A1 | 11/2005 | Coggio et al. | |
| 2005/0260414 A1 | 11/2005 | MacQueen | |

FOREIGN PATENT DOCUMENTS

| | | |
|---|---|---|
| EP | 1298180 | 4/2003 |
| JP | 1993/209030 | 8/1993 |
| JP | 10-72568 | 3/1998 |
| JP | 1999/080312 | 3/1999 |
| JP | 2004/204096 | 7/2004 |
| WO | WO 00/50517 | 8/2000 |
| WO | WO 03/072625 | 9/2003 |
| WO | WO 03/100158 | 12/2003 |
| WO | WO 03/100159 | 12/2003 |
| WO | WO 2004/067499 | 6/2004 |
| WO | WO 2005/049687 | 6/2005 |
| WO | WO 2006/007507 | 1/2006 |

OTHER PUBLICATIONS

Solvay Solexis Product Data Sheet, Modified Dec. 13, 2002, http://www.solvaysolexis.com/static//wma/pdf/5/4/3/4/fom_thin.pdf.
U.S. Appl. No. 11/087,413, Klun et al., filed Mar. 23, 2005, 60 pages.
Macromol. Chem. Phys. 198, 1893-1907 (1997).
Edward Cohen and Edgar Gutoff, Modern Coating and Drying Technology, VCH Publishers, NY 1992, ISBN 3-527-28246-7.
Edward Cohen and Edgar Gutoff, Coating and Drying Defects: Troubleshooting Operating Problems, Wiley Interscience, NY Aug. 9, 2001, ISBN 0-471-59810-0.
Bongiovanni et al.: Properties of UV-cured coatings; examples with perfluoropolyether urethane acrylates; Progress in Organic Coatings 36 (1999) 70-78.

* cited by examiner

*Primary Examiner*—Thao T. Tran
(74) *Attorney, Agent, or Firm*—Lisa P. Fulton

(57) ABSTRACT

A flooring substrate comprising a coating of a curable composition that comprises (a) a reaction product of (i) a polyisocyanate, (ii) one or more perfluoropolyether compounds having at least one hydroxyl group and (iii) an organic compound having one or more free radical polymerizable groups and at least one hydroxyl group; and (b) a compound capable of free radical copolymerization with the reaction product and comprising at least two free radical polymerizable groups.

13 Claims, No Drawings

FLOORING SUBSTRATE HAVING A COATING OF A CURABLE COMPOSITION

FIELD

The invention relates to a flooring substrate comprising a coating of a curable composition comprising perfluoroether group containing polymerizable compounds. The invention further relates a flooring substrate obtained by curing the curable composition.

BACKGROUND

In recent years, many efforts have been made to provide hard surfaces with a repellent coating. These coatings are typically resin-based mixtures that can be cured using ultraviolet (UV) radiation or heat. In order to improve repellency properties, resin-based mixtures comprising fluorochemical compounds have been proposed.

For example, US 2005/0260414 discloses a coated flooring substrate, comprising a flooring substrate and a coating on said substrate, wherein said coating comprises a cured resin and a low surface energy additive having a fluorocarbon functional group, in which said cured resin and said low surface energy additive each comprise a cured form of a substantially reactive group.

WO 2006/007507 relates to a method of protecting a flooring surface and flooring materials by providing a hardcoat surface layer comprising a perfluoropolyether.

US 2005/0137355 discloses coating compositions that can be used to impart hydrophobicity, oleophobicity, stain resistance or combinations thereof to various substrates. The coating compositions include an amino resin and a reactive fluorinated copolymer. The reactive fluorinated copolymer has pendant perfluoropolyether groups as well as pendant groups capable of reacting with the amino resins.

U.S. Pat. No. 6,238,798 relates to ceramer compositions comprising a plurality of colloidal inorganic oxide particles and a free-radically curable binder precursor. The free-radically curable binder precursor comprises a fluorochemical component that further comprises at least two free-radically curable moieties and at least one fluorinated moiety. The compositions are said to provide excellent stain, oil and/or water repellent characteristics as well as a high level of abrasion resistance and hardness.

There continues to be a need for curable coating compositions that can be applied to a flooring substrate and cured to provide good or excellent repellency properties such as water-, oil- and/or stain repellency to the flooring substrate. Desirably, these properties are durable, i.e., the coating composition has good abrasion resistance properties as well. It would furthermore or alternatively be desirable to find coatings that can provide good or excellent stain release properties to a flooring substrate. Desirably, the coating compositions are environmentally more benignant and/or can be produced in a reliable, convenient and cost effective way. In particular, it is desirable to provide a flooring substrate having a curable coating composition that contains low levels of volatile organic solvents (VOCs) and that can be easily cured without complicated or special measures.

BRIEF SUMMARY OF INVENTION

The invention provides in one aspect a flooring substrate comprising a coating of a curable composition, said curable composition comprising:

(a) a reaction product of (i) a polyisocyanate, (ii) one or more perfluoropolyether compounds having at least one hydroxyl group and (iii) an organic compound having one or more free radical polymerizable groups and at least one hydroxyl group; and (b) a compound capable of free radical copolymerization with said reaction product and comprising at least two free radical polymerizable groups.

In a typical embodiment, the reaction product in aforementioned curable composition has at least one free radical polymerizable groups.

In another aspect, the invention provides a flooring substrate comprising a coating comprising a cured composition obtainable by curing a curable composition as defined above.

In a particular embodiment, the invention provides a flooring substrate comprising a coating of a curable composition, as defined above wherein said perfluoropolyether compound has a perfluoropolyether group corresponding to the formula:

$F(CF(CF_3)CF_2O)_aCF(CF_3)—$ wherein a is at least 3.

It has been found that flooring substrates, in particular hard and resilient non porous flooring substrates, comprising a coating comprising a cured composition obtainable by curing a curable composition as defined above, typically have good to excellent stain resistance and/or good or excellent stain release properties combined generally with excellent repellency and durability properties. It has further been found that the curable composition can typically be cured in the presence of oxygen, i.e. the curing can take place in the presence of air and thus the curing can be easily carried out without the need for special measures such as curing in an inert environment of, e.g., nitrogen or the like. Yet, the beneficial properties obtained after curing are generally not sacrificed when curing takes place in air.

The curable composition comprises the reaction product of a polyisocyanate, one or more perfluoropolyether compounds having at least one hydroxyl group and an organic compound having one or more free radical polymerizable groups and at least one hydroxyl group.

By the term "free radical polymerizable group" is meant a group that is capable of undergoing a free radical polymerization reaction upon exposure to a suitable source of curing energy and optionally with the aid of a polymerization initiator. Generally the free-radical polymerizable group is a functional group that typically contains an ethylenically unsaturated group. Examples of free radical polymerizable groups include, for example, vinyl ethers, vinyl esters, allyl esters, vinyl ketones, styrene, vinyl amide, acrylamides, maleates, fumarates, acrylates and methacrylates. Of these, the esters of alpha, beta unsaturated acids, such as the acrylates and methacrylates are particularly suitable.

By the term "perfluoropolyether compound" is meant a compound having a fluorinated polyether group that consists of carbon and fluorine and that contains at least two ether linkages.

DETAILED DESCRIPTION OF ILLUSTRATIVE EMBODIMENTS

The perfluoropolyether compound useful in the curable composition of the present invention can be represented by the formula (I):

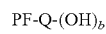

$PF-Q-(OH)_b$     (I)

wherein PF represents a perfluoropolyether group, Q represents a divalent or trivalent non-fluorinated organic linking group, b is 1 or 2, and preferably b is 1. Examples of linking groups Q include organic groups that comprise aromatic or aliphatic groups that may be interrupted by O, N or S and that may be substituted, alkylene groups, oxy groups, thio groups, urethane groups, carboxy groups, carbonyl groups, amido groups, oxyalkylene groups, thioalkylene groups, carboxyalkylene, and/or amidoalkylene groups.

In one embodiment of the invention, the perfluorinated polyether group PF of formula (I) is a monovalent perfluoropolyether moiety composed of groups according to the formula:

$$F(R_{fc}O)_x C_d F_{2d}—$$

wherein each $R_{fc}$ independently represents a perfluorinated alkylene group, each x independently represents an integer greater than or equal to 3, and wherein d is an integer from 1 to 6. The perfluoroalkylene group $R_{fc}$ may be linear or branched and may comprise from 1 to 10 carbon atoms, particularly suitable from 1 to 6 carbon atoms.

Examples of perfluorinated alkyleneoxy groups —$R_{fc}$O— include: —$CF_2CF_2O$—, —$CF(CF_3)CF_2O$—, —$CF_2CF(CF_3)O$—, —$CF_2CF_2CF_2O$—, —$CF_2O$—, —$CF(CF_3)O$—, —$CF_2CF_2CF_2CF_2$—O—.

The perfluorinated polyalkyleneoxy group may be comprised of the same perfluorinated alkylene oxy units or of a mixture of different perfluorinated alkylene oxy units. When the perfluorinated polyalkyleneoxy group is composed of different perfluorinated alkylene oxy units, they can be present in a random configuration, alternating configuration or they can be present as blocks. Typical examples of perfluorinated polyalkylene oxy groups include: —$[CF_2CF_2O]_r$—; —$[CF(CF_3)CF_2O]_s$—; —$[CF_2CF_2O]_{i'}[CF_2O]_j$—; and —$[CF_2CF_2O]_l$—$[CF(CF_3)CF_2O]_k$—; wherein r is an integer of 5 to 25, s is an integer of 3 to 25 and i', l, k, and j each are integers of 3 to 25.

A particularly suitable perfluorinated polyether group that corresponds to formula (I) is:

$$F(CF(CF_3)CF_2O)_a CF(CF_3)—$$

wherein a is at least 3. Perfluorinated polyether groups of the above formula can conveniently be derived from the oligomerization of hexafluoropropyleneoxide (HFPO). In a particular suitable embodiment, a is an integer of 3 to 25 and the corresponding perfluorinated polyether group has a molecular weight of at least 750 g/mol.

Suitable examples of perfluoropolyether compounds according to formula (I) include
$F(CF(CF_3)CF_2O)_a CF(CF_3)$—$CONR^c$—$CH_2CHOHCH_2OH$ wherein $R^c$ is hydrogen or an alkyl group of for example 1 to 4 carbon atoms;
$F(CF(CF_3)CF_2O)_a CF(CF_3)$—$CONH$-1,4-dihydroxyphenyl;
$F(CF(CF_3)CF_2O)_a CF(CF_3)$—$CH_2OCH_2CHOHCH_2OH$;
$F(CF(CF_3)CF_2O)_a CF(CF_3)$—$COOCH_2CHOHCH_2OH$;
$F(CF(CF_3)CF_2O)_a CF(CF_3)$—$CONR^d$—$(CH_2)_v OH$;
$F(CF(CF_3)CF_2O)_a CF(CF_3)$—$CONR^d$—$((CH_2)_v$—$O)_w H$; and
$F(CF(CF_3)CF_2O)_a CF(CF_3)$—$CONHCH_2CH_2CH_2N(CH_2CH_2OH)_2$
where $R^d$ is hydrogen or an alkyl group such as methyl, ethyl, propyl, butyl, hexyl, v is 2, 3, 4, 6, 8, 10, or 11 and w is 1 to 4; in all examples a is at least 3. Particularly suitable examples include:

$$F(CF(CF_3)CF_2O)_a CF(CF_3)—CONR^d—(CH_2)_v OH$$

where $R^d$ is hydrogen, v is 2 and a is at least 3.

The polyisocyanate is selected from one or more aliphatic isocyanates having 2, 3, or 4 isocyanate groups, one or more aromatic isocyanates having 2, 3, or 4 isocyanate groups and mixtures thereof. Examples of aliphatic diisocyanates include hexamethylenediisocyanate, 2,2,4-trimethyl-1,6-hexamethylenediisocyanate, and 1,2-ethylenediisocyanate, dicyclohexylmethane-4,4'-diisocyanate, 3-isocyanatomethyl-3,5,5-trimethylcyclohexylisocyanate(isophorone diisocyanate IPDI). Examples of aliphatic triisocyanates include 1,3,6-hexamethylenetriisocyanate, cyclic trimer of hexamethylenediisocyanate and cyclic trimer of isophorone diisocyanate (isocyanurates). Examples of aromatic diisocyanates include 4,4'-methylenediphenylenediisocyanate, 4,6-di(trifluoromethyl)-1,3-benzene diisocyanate, 2,4-toluenediisocyanate, 2,6-toluene diisocyanate, o, m, and p-xylylene diisocyanate, 4,4'-diisocyanatodiphenylether, 3,3'-dichloro-4,4'-diisocyanatodiphenylmethane, 4,5'-diphenyldiisocyanate, 4,4'-diisocyanatodibenzyl, 3,3'-dimethoxy-4,4'-diisocyanatodiphenyl, 3,3'-dimethyl-4,4'-diisocyanatodiphenyl, 2,2'-dichloro-5,5'-dimethoxy-4,4'-diisocyanato diphenyl, 1,3-diisocyanatobenzene, 1,2-naphthylene diisocyanate, 4-chloro-1,2-naphthylene diisocyanate, 1,3-naphthylene diisocyanate, and 1,8-dinitro-2,7-naphthylene diisocyanate. Examples of aromatic triisocyanates include polymethylene-polyphenylisocyanate (PAPI).

Also useful are isocyanates containing internal isocyanate-derived moieties such as biuret-containing tri-isocyanates, such as DESMODUR™ N-100 or TOLONATE HDB, commercially available from Bayer or Rhodia, respectively; isocyanurate-containing tri-isocyanates, such as IPDI-1890, commercially available from Huls AG, Germany; azetedinedione-containing diisocyanates such as DESMODUR™ TT, commercially available from Bayer. Also, other commercially available di- or tri-isocyanates such as DESMODUR™ L and DESMODUR™ W, tri-(4-isocyanatophenyl)-methane (DESMODUR™ R) (all available from Bayer) and DDI 1410 (available from Henkel) are suitable. Particularly suitable polyisocyanates include diisocyanates, such as IPDI and polyisocyanates derived from hexamethylenediisocyanate, such as Desmodur™ N100 and Tolonate HDB.

In one embodiment of the invention, the organic compounds having one or more free radical polymerizable groups and at least one hydroxyl group can be represented by the following formula:

$$(HO)_x Q^1(A)_p,$$

wherein $Q^1$ represents a linking group; p is at least one, x is at least 1, e.g., 1 or 2, and A represents a free radical polymerizable group. In a particularly suitable embodiment, A represents a (meth)acryl functional group that can be represented by the formula —$OC(O)C(R_2)$=$CH_2$, where $R_2$ is a lower alkyl with 1 to 4 C atoms or H or F. $Q^1$ is a linking group of valency at least 2. $Q^1$ may be a linear, branched or cyclic aliphatic or aromatic group that may optionally contain one or more hetero-atoms. Particular examples of linking groups include an alkylene, an arylene, an aralkylene, an alkarylene, a straight or branched chain or cyclic group-containing aliphatic group optionally containing heteroatoms such as O, N, and S and optionally a heteroatom-containing functional group such as carbonyl or sulfonyl, and combinations thereof.

Particular examples of organic compounds include hydroxyethyl(meth)acrylate, 1,3-glycerol dimethacrylate, hydroxypropyl(meth)acrylate, pentaerythritol triacrylate, commercially available as SR444 from Sartomer and dipentaerythritol pentaacrylate, commercially available as SR399 from Sartomer.

In one embodiment of the invention, curable composition comprises a reaction product that has at least two free radical polymerizable groups and can be represented by formula (II):

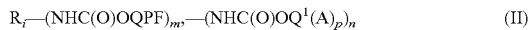

$$R_i\text{—(NHC(O)OQPF)}_m\text{—(NHC(O)OQ}^1(A)_p)_n \quad (II)$$

wherein $R_i$ is the residue of a polyisocyanate; PF, A, Q and $Q^1$ are as defined above, m is at least 1; n is at least 1; p is 1 to 6, m+n is 2 to 4, and in which each unit referred to by the subscripts m and n is attached to an $R_i$ unit. Typically, the maximum value m+n can take is equal to the number of isocyanate groups in the polyisocyanate from which $R_i$ is deriving.

One representative structure of a reaction product according to formula II includes:

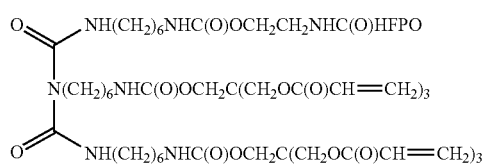

(2)

wherein HFPO represents $F(CF(CF_3)CF_2O)_a CF(CF_3)$-Q- wherein a is at least 3 and Q is as defined above.

The reaction product (2) is for example one that results from the reaction of the biuret of HDI (Des N) with one equivalent of an oligomer amidol of the formula $F(CF(CF_3)CF_2O)_{6.5}CF(CF_3)C(O)NHCH_2CH_2OH$, and further with two equivalents of pentaerythritol triacrylate.

Typically, the reaction product of the curable composition can be made by first reacting the polyisocyanate with the perfluoropolyether compound, followed by reaction with an organic compound having one or more free radical polymerizable groups and at least one hydroxyl groups. Alternately, the reaction product can be made by reacting the polyisocyanate with the organic compound having one or more free radical polymerizable groups and at least one hydroxyl groups, followed by reaction with the perfluoropolyether compound. In yet another embodiment, the reaction product can be made by reacting all three components in a one pot reaction or single step reaction.

By their method of synthesis, the resulting reaction products are normally mixtures. If the mole fraction of isocyanate groups is arbitrarily given a value of 1.0, then the total mole fraction of m and n units used in making materials of formula II can be 1.0, greater or smaller than 1.0. If the mole of m and n units is less than 1.0, a reaction product with free isocyanate groups will be formed. These isocyanate groups can further react during curing of the curable composition by means of atmospheric moisture. In a particular suitable embodiment, the mole fraction of m and n units is 1.0 or greater than 1.0. The mole fraction of m:n typically ranges from 0.95:0.05 to 0.05:0.95. Suitably, the mole fractions of m:n are from 0.50:0.50 to 0.05:0.95. Particularly suitable, the mole fractions of m:n are from 0.25:0.75 to 0.05:0.95 and most preferably, the mole fractions of m:n are from 0.25:0.75 to 0.10:0.95. In the instances the mole fractions of m:n total more than one, such as 0.15:0.90, the m unit is reacted onto the isocyanate first, and a slight excess (0.05 mole fraction) of the n units are used.

In a formulation, for instance, in which 0.15 mole fractions of m and 0.85 mole fraction of n units are introduced, a distribution of products is formed in which some fraction of products formed contain no m units. Generally this product distribution, will include materials of formula (II).

The reaction product of the curable composition can be prepared in the presence of an organic solvent free of isocyanate reactive groups. Suitable examples include ethylacetate, methylisobutyl ketone, acetone and halogenated solvents such $C_4F_9OCH_3$ or trifluorotoluene.

In another embodiment, particularly when the reaction product is liquid and does not have a too high viscosity, the reaction product can be produced without the need for an organic solvent. In a further embodiment, the reaction product can be produced in the presence of a reactive diluent having at least one free radical polymerizable group as a solvent. Generally, the reactive diluent should not have a Zerewitinoff hydrogen, i.e., should not be an isocyanate reactive compound. This latter embodiment offers in particular the advantage that the resulting composition after the reaction does not require removal of organic solvent and may be used as is without further modifications to produce a curable composition.

Suitable reactive diluent typically have an ethylenically unsaturated group and are free of isocyanate reactive groups. The reactive diluent is generally used to solubilise the reactants and the reaction products formed during the reaction. Particular useful diluents are liquid at a temperature of about 20° C. Examples of suitable reactive diluents include monomers having an acrylate or methacrylate group, such as methyl methacrylate, ethyl methacrylate n-butyl(meth)acrylate, isobutyl(meth)acrylate, octadecyl(meth)acrylate, lauryl(meth)acrylate, cyclohexyl(meth)acrylate, cyclodecyl(meth)acrylate, isobornyl(meth)acrylate, phenyl(meth)acrylate, phenoxyethyl acrylate, benzyl(meth)acrylate, adamantyl(meth)acrylate, tolyl(meth)acrylate, 3,3-dimethylbutyl(meth)acrylate, (2,2-dimethyl-1-methyl)propyl(meth)acrylate, cyclopentyl(meth)acrylate, 2-ethylhexyl(meth)acrylate, t-butyl(meth)acrylate, cetyl(meth)acrylate, stearyl(meth)acrylate, behenyl(meth)acrylate, isooctyl(meth)acrylate, n-octyl(meth)acrylate, 4-ethyl-cyclohexyl(meth)acrylate, 2-ethoxyethyl methacrylate, tetrahydrofurfuryl acrylate and tetrahydropyranyl acrylate. Further examples of suitable reactive diluents include di- and poly(meth)acrylates, such as butanedioldiacrylate, hexanedioldiacrylate and trimethylolpropanetriacrylate. Further suitable reactive diluents include monomers having one or more vinyl ether groups, such as cetyl vinyl ether, dodecylvinyl ether, ethylvinyl ether. Further reactive diluents include monomers having one or more N-vinyl amides, such as N-vinyl caprolactam and N-vinylformamide; acrylamides, such as acrylamide, methacrylamide, n-diisopropyl acrylamide and diacetone acrylamide. Still further examples of reactive diluents include vinyl esters, such as vinyl 2-ethylhexanoate and vinyl-decanoate. Particularly suitable reactive diluents include methyl methacrylate and butanediol diacrylate.

The reaction of the polyisocyanate, one or more perfluoropolyether compounds having at least one hydroxyl group and an organic compound having one or more free radical polymerizable groups and at least one hydroxyl group, is typically carried out in the presence of a catalyst. Suitable catalysts include tin salts such as dibutyltin dilaurate, stannous octanoate, stannous oleate, tin dibutyldi-(2-ethyl hexanoate), stannous chloride and others known in the art. The amount of catalyst present will depend on the particular reaction. Generally, suitable catalyst concentrations are from about 0.001 to about 10% by weight, particularly suitable between about 0.1% and about 5% by weight based on the total weight of reactants.

The compound capable of free radical copolymerization with said reaction product (i) as defined above and comprising at least two free radical polymerizable groups include, for example, poly(meth)acryl monomers selected from the group consisting of (a) di(meth)acryl containing compounds such as 1,3-butylene glycol diacrylate, 1,4-butanediol diacrylate, 1,6-hexanediol diacrylate, 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, caprolactone modified neopentylglycol hydroxypivalate diacrylate, cyclohexanedimethanol diacrylate, diethylene glycol diacrylate, dipropylene glycol diacrylate, ethoxylated (10) bisphenol A diacrylate, ethoxylated (3) bisphenol A diacrylate, ethoxylated (30) bisphenol A diacrylate, ethoxylated (4) bisphenol A diacrylate, hydroxypivalaldehyde modified trimethylolpropane diacrylate, neopentyl glycol diacrylate, polyethylene glycol (200) diacrylate, polyethylene glycol (400) diacrylate, polyethylene glycol (600) diacrylate, propoxylated neopentyl glycol diacrylate, tetraethylene glycol diacrylate, tricyclodecanedimethanol diacrylate, triethylene glycol diacrylate, tripropylene glycol diacrylate; (b) tri(meth)acryl containing compounds such as PETA (pentaerythritol tri acrylate). One commercially available form of pentaerythritol triacrylate ("PET3A") is SR444, available from Sartomer Company of Exton, Pa. Further examples include glycerol triacrylate, trimethylolpropane triacrylate, ethoxylated triacrylates (e.g., ethoxylated (3) trimethylolpropane triacrylate, ethoxylated (6) trimethylolpropane triacrylate, ethoxylated (9) trimethylolpropane triacrylate, ethoxylated (20) trimethylolpropane triacrylate), propoxylated triacrylates (e.g., propoxylated (3) glyceryl triacrylate, propoxylated (5.5) glyceryl triacrylate, propoxylated (3) trimethylolpropane triacrylate, propoxylated (6) trimethylolpropane triacrylate), trimethylolpropane triacrylate, tris(2-hydroxyethyl)isocyanurate triacrylate; (c) higher functionality (meth)acryl containing compounds such as example pentaerythritol tetra acrylate, one commercially available form of pentaerythritol tetraacrylate ("PET4A") is SR295, available from Sartomer Company of Exton, Pa. Further examples include ditrimethylolpropane tetraacrylate, dipentaerythritol pentaacrylate, ethoxylated (4) pentaerythritol tetraacrylate, caprolactone modified dipentaerythritol hexaacrylate; (d) oligomeric (meth)acryl compounds such as, for example, urethane acrylates, such as aliphatic urethane di- and triacrylates, commercially from Sartomer. Further examples include polyester acrylates, epoxy acrylates; polyacrylamide analogues of the foregoing; and combinations thereof. Such compounds are widely available from vendors such as, for example, Sartomer Company of Exton, Pa.; UCB Chemicals Corporation of Smyrna, Ga.; and Aldrich Chemical Company of Milwaukee, Wis. Additional useful (meth) acrylate materials include hydantoin moiety-containing poly (meth)acrylates, for example, as described in U.S. Pat. No. 4,262,072 (Wendling et al.).

In a particular embodiment, mixtures of compounds capable of free radical copolymerization with said reaction product and comprising at least two free radical polymerizable groups are used.

The curable composition typically comprises the reaction product of polyisocyanate, fluoropolyether compound and organic compound as defined above in an amount between about 0.01% and about 10%, and more preferably between about 0.1% and about 3%, of the total solids of the curable composition.

To facilitate curing, the curable compositions further comprise at least one free-radical thermal initiator and/or photoinitiator. Useful free-radical thermal initiators include, for example, azo, peroxide, persulfate, and redox initiators, and combinations thereof.

Useful free-radical photoinitiators include, for example, those known as useful in the UV cure of acrylate polymers. Such initiators include benzophenone and its derivatives; benzoin, alpha-methylbenzoin, alpha-phenylbenzoin, alpha-allylbenzoin, alpha-benzylbenzoin; benzoin ethers such as benzil dimethyl ketal (commercially available under the trade designation "IRGACURE 651" from Ciba Specialty Chemicals Corporation of Tarrytown, N.Y.), benzoin methyl ether, benzoin ethyl ether, benzoin n-butyl ether; acetophenone and its derivatives such as 2-hydroxy-2-methyl-1-phenyl-1-propanone (commercially available under the trade designation "DAROCUR 1173" from Ciba Specialty Chemicals Corporation) and 1-hydroxycyclohexyl phenyl ketone (commercially available under the trade designation "IRGACURE 184", also from Ciba Specialty Chemicals Corporation); 2-methyl-1-[4-(methylthio)phenyl]-2-(4-morpholinyl)-1-propanone commercially available under the trade designation "IRGACURE 907", also from Ciba Specialty Chemicals Corporation); 2-benzyl-2-(dimethylamino)-1-[4-(4-morpholinyl)phenyl]-1-butanone commercially available under the trade designation "IRGACURE 369" from Ciba Specialty Chemicals Corporation); aromatic ketones such as benzophenone and its derivatives and anthraquinone and its derivatives; onium salts such as diazonium salts, iodonium salts, sulfonium salts; titanium complexes such as, for example, that which is commercially available under the trade designation "CGI 784 DC", also from Ciba Specialty Chemicals Corporation); halomethylnitrobenzenes; and mono- and bis-acylphosphines such as those available from Ciba Specialty Chemicals Corporation under the trade designations "IRGACURE 1700", "IRGACURE 1800", "IRGACURE 1850", "IRGACURE 819" "IRGACURE 2005", "IRGACURE 2010", "IRGACURE 2020" and "DAROCUR 4265". Combinations of two or more photoinitiators may be used. Further, sensitizers such as 2-isopropyl thioxanthone, commercially available from First Chemical Corporation, Pascagoula, Miss., may be used in conjunction with photoinitiator(s) such as "IRGACURE 369". The amount of catalyst present will depend on the particular reaction. Generally, suitable catalyst concentrations are from about 0.1% to about 10% by weight, particularly suitable between about 0.5% and about 5% by weight based on the total weight of reactants. In a particular suitable embodiment, the curable composition may be cured in the presence of air.

In still another embodiment, the coating composition may further contain additives, including inorganic particles in particular colloidal inorganic particles so as to obtain a so-called ceramer composition.

Inorganic oxide particles for use in a ceramer composition are desirably substantially spherical in shape, relatively uniform in size (have a substantially monodisperse size distribution) or a polymodal distribution obtained by blending two or more substantially monodisperse distributions. It is further preferred that the inorganic oxide particles be and remain substantially non-aggregated (substantially discrete), as aggregation can result in precipitation of the inorganic oxide particles or gellation of the ceramer composition, which, in turn, results in a dramatic, undesirable increase in viscosity. As a result of these effects, aggregation of the inorganic oxide particles can reduce both adhesion to a substrate and optical clarity of the ceramer composition.

It is further preferred that the inorganic oxide particles be colloidal in size, i.e., characterized by an average particle diameter of about 1 nanometer to about 200 nanometers, preferably from about 1 nanometer to about 100 nanometers, more preferably from about 2 nanometers to about 75 nanometers. These size ranges facilitate ease of dispersion of the colloidal inorganic oxide particles into the ceramer composition and provide ceramer composites that are smoothly surfaced and optically clear. Average particle size of the colloidal inorganic oxide particles can be measured using transmission electron microscopy to count the number of colloidal inorganic oxide particles of a given diameter.

A wide range of colloidal inorganic oxide particles can be used in the ceramer compositions of the present invention. Representative examples include colloidal silica, colloidal titania, colloidal alumina, colloidal zirconia, colloidal vanadia, colloidal chromia, colloidal iron oxide, colloidal antimony oxide, colloidal tin oxide, and mixtures thereof. The colloidal inorganic oxide particles can comprise essentially a single oxide such as silica, a combination of oxides, such as silica and aluminum oxide, or a core of an oxide of one type (or a core of a material other than a metal oxide) on which is deposited an oxide of another type.

In one preferred embodiment, for example, the colloidal inorganic oxide particles advantageously may comprise a major amount of a first plurality of primary colloidal inorganic oxide particles, e.g., silica, and a minor amount of a second plurality of one or more other colloidal inorganic oxide particles (i.e., "additive oxide(s)"), preferably an aluminum oxide. As used herein, "major amount" means that the colloidal inorganic oxide particles include at least about 60% by weight, preferably about 80% by weight, more preferably at least about 95% by weight, most preferably at least about 98% by weight of that component based on the total weight of the particles. "Minor amount" means that the colloidal inorganic oxide particles include up to about 40% by weight, preferably up to about 20% by weight, more preferably up to about 5% by weight, most preferably up to about 2% by weight of that component based on the total weight of the particles.

The optimum amount of additive colloidal inorganic oxide particles to be incorporated into a ceramer composition will depend upon a number of factors including the type(s) of additive colloidal inorganic oxide particle(s) being used, the desired end use of the ceramer composition, and the like. Generally, if too much of the additive colloidal inorganic oxide particles is used, the resultant cured ceramer composite may become more hazy than desired. It is additionally possible that the level of abrasion resistance may also be unduly reduced. As a guideline, particularly preferred ceramer compositions may include about 100 parts by weight of silica, i.e., primary colloidal inorganic oxide particles, and from about 0.01 to about 10, preferably from about 1 to about 2 parts by weight of an oxide other than silica, preferably an aluminum oxide, i.e., additive colloidal inorganic oxide particles.

The colloidal inorganic oxide particles are desirably provided in the form of a sol (e.g., colloidal dispersions of inorganic oxide particles in liquid media), especially aqueous sols of amorphous silica. Unlike other forms in which the colloidal inorganic oxide particles may be supplied (e.g., fumed silica which comprises irregular aggregates of colloidal particles), colloidal inorganic oxide particles supplied in the form of sols tend to be substantially monodisperse in size and shape.

The ceramer composition may further include other optional additives. For example, if desired, the ceramer composition may include solvents, surfactants, antistatic agents, leveling agents, initiators (e.g. a disclosed above), photosensitizers, stabilizers, absorbers, antioxidants, fillers, fibers, lubricants, pigments, dyes, plasticizers, suspending agents and the like. Also in a particular embodiment, surface treatment agents may be included that can react with the inorganic oxide particles and/or the substrate's surface to which the ceramer composition is to be applied.

Examples of leveling agents include, but are not limited to, alkylene oxide terminated polysiloxanes, such as those available under the trade designation "DOW 57" (a mixture of dimethyl-, methyl-, and (polyethylene oxide acetate-capped) siloxane) from Dow Corning, Midland, Mich.; and fluorochemical surfactants such as those available under the trade designations "FC4430", and "FC4432", from 3M Co., St. Paul, Minn. Combinations of different leveling agents can be used if desired. Preferably, if a leveling agent is to be included in the ceramer composition, the leveling agent is present in an amount effective to improve the flow and wetting characteristics of the ceramer composition. Generally, the leveling agent will be effective to impart these desired characteristics in amounts of up to about 3% by weight, and more preferably from about 0.01 to about 1%, based on the total weight of the ceramer composition solids.

In addition to the initiator, a ceramer composition can include a photosensitizer. The photosensitizer aids in the formation of free radicals that initiate curing of the curable binder precursors, especially in an air atmosphere. Suitable photosensitizers include, but are not limited to, aromatic ketones and tertiary amines. Suitable aromatic ketones include, but are not limited to, benzophenone, acetophenone, benzil, benzaldehyde, and o-chlorobenzaldehyde, xanthone, thioxanthone, 9,10-anthraquinone, and many other aromatic ketones. Suitable tertiary amines include, but are not limited to, methyldiethanolamine, ethyldiethanolamine, triethanolamine, phenylmethyl-ethanolamine, dimethylaminoethylbenzoate, and the like. Typically, if used, an amount of photosensitizer is included in the ceramer compositions to effect the desired level and rate of cure. Preferably, the amount of photosensitizer used in ceramer compositions is about 0.01 to about 10%, more preferably about 0.05 to about 5%, and most preferably about 0.25 to about 3% by weight, based on the total weight of the ceramer composition solids. It should be understood that combinations of different photosensitizers can be used if desired.

Both ultraviolet stabilizers and ultraviolet absorbers can improve the weatherability and reduce the time-induced discoloration of the ceramer composition. An example of an ultraviolet absorber suitable for use in the ceramer composition of the present invention is that commercially available under the trade designation "TINUVIN 1130" (hydroxyphenyl benzotriazole) and an example of an hindered amine light stabilizer suitable for use in the ceramer composition of the present invention is that commercially available under the trade designation "TINUVIN 292" (bis(1,2,2,6,6-pentamethyl-4-piperidinyl)sebacate), both of which are available from Ciba-Geigy. The ceramer composition can include an amount of a stabilizer, an absorber, or a combination thereof to impart the desired result. Preferably, the ultraviolet stabilizer and/or absorber is present in an amount up to about 10% by weight, and more preferably about 1 to about 5%, based on the total weight of the ceramer composition solids. It should be understood that combinations of different ultraviolet stabilizers and absorbers can be used if desired.

An ozone stabilizer protects against degradation resulting from reaction with ozone. Examples of ozone stabilizers include, but are not limited to, hindered amines such as that available under the trade designation "IRGANOX 1010"

from Ciba-Geigy and phenothiazine commercially available from Aldrich Chemical Company, Inc., Milwaukee, Wis. The ceramer composition can include an amount of an ozone stabilizer to impart the desired result. Preferably, the ozone stabilizer is present in an amount up to about 1% by weight, more preferably from about 0.1 to about 1.0%, and most preferably from about 0.3 to about 0.5%, based on the total weight of the ceramer composition solids. It should be understood that combinations of different ozone stabilizers can be used if desired.

A thermal stabilizer/antioxidant reduces the amount of yellowing as a result of weathering. Examples of such materials include, but are not limited to, low melting hindered phenols and triesters. Specific examples include 2,6-di-tert-butyl-4-methylphenol, commercially available under the trade designation "ULTRANOX 226" from Borg Warner Chemicals, Inc., Parkersburg, N.Y.; octadecyl 3,5-di-tert-butyl-4-hydroxyhydroxcinnamate, commercially available under the trade designations "ISONOX 132" antioxidant from Schenectady Chemicals, Inc., Schenectady, N.Y.; or "VANOX 1320" commercially available from Vanderbilt Co., Inc., Norwalk, Conn. The ceramer composition can include an amount of the thermal stabilizer/antioxidant to impart the desired result. Preferably, the thermal stabilizer/antioxidant is present in an amount up to about 3% by weight, and more preferably about 0.5 to about 1%, based on the total weight of the ceramer composition solids. It should be understood that combinations of different thermal stabilizers/antioxidants can be used if desired.

The curable composition (or ceramer composition) can be coated onto the flooring substrate using a variety of techniques, including dip coating, forward and reverse roll coating, wire wound rod coating, and die coating. Die coaters include knife coaters, slot coaters, slide coaters, fluid bearing coaters, slide curtain coaters, drop die curtain coaters, and extrusion coaters among others. Many types of die coaters are described in the literature such as by Edward Cohen and Edgar Gutoff, Modern Coating and Drying Technology, VCH Publishers, NY 1992, ISBN 3-527-28246-7 and Gutoff and Cohen, Coating and Drying Defects: Troubleshooting Operating Problems, Wiley Interscience, NY ISBN 0-471-59810-0.

A die coater generally refers to an apparatus that utilizes a first die block and a second die block to form a manifold cavity and a die slot. The coating fluid, under pressure, flows through the manifold cavity and out the coating slot to form a ribbon of coating material. Coatings can be applied as a single layer or as two or more superimposed layers. Although it is usually convenient for the substrate to be in the form of a continuous web, the substrate may also be a succession of discrete sheets.

Particularly suitable flooring substrates that may be provided with the curable composition and in particular with a ceramer composition include hard and resilient non-porous flooring substrates, for example those selected from the group consisting of ceramic substrates, wood, laminate, vinyl, rubber, polished or unpolished marble and linoleum.

EXAMPLES

The following examples further illustrate the invention without the intention however to limit the invention thereto. All parts are by weight unless indicated otherwise.

Abbreviations

CN981: aliphatic urethane diacrylate (Sartomer/Cray Valley)
CN998B80: aliphatic urethane triacrylate (Sartomer/Cray Valley)
DES N100: Desmodur™ N100: Hexamethylene diisocyanate biuret available from Bayer/Lanxess AG
DES N3300: Desmodur™ N3300: HMDI trimer (triisocyanurate) from Bayer/Lanxess AG
(HFPO)-alc: $F(CF(CF_3)CF_2O)_{6.85}CF(CF_3)C(O)NHCH_2CH_2OH$
(HFPO)-diol: $F(CF(CF_3)CF_2O)_{6.85}CF(CF_3)C(O)NHCH_2CH_2CH_2N(CH_2CH_2OH)_2$
(HFPO)-acryl: $F(CF(CF_3)CF_2O)_{6.85}CF(CF_3)C(O)NHCH_2CH_2OCO-CH=CH_2$
Irgacure 184: photoinitiator available from Ciba-Geigy
MEK: Methyl ethyl ketone
IPA: isopropylalcohol
MMA: methyl methacrylate
SR444: pentaerythritol triacrylate from Sartomer, Cray Valley
SR 399: dipentaerythritol pentaacrylate (Sartomer/Cray Valley)
SR 494: ethoxylated pentaerythritol tetraacrylate (Sartomer/Cray Valley)
TPGDA: tripropylene glycol diacrylate from Aldrich

A. Synthesis of Intermediates and Curable Compositions

Synthesis of (HFPO)-alc: $F(CF(CF_3)CF_2O)_{6.85}CF(CF_3)C(O)NHCH_2CH_2OH$ (HFPO)-alc was prepared from the corresponding (HFPO)-ester:

$$F(CF(CF_3)CF_2O)_{6.85}CF(CF_3)COOCH_3.$$

A 1 liter 3-necked reaction flask was equipped with a stirrer, a condenser, a dropping funnel, a heating mantle and a thermometer. The flask was charged with 1000 g (HFPO)-ester. The mixture was heated to 40° C. and 43.4 g ethanolamine was added via the dropping funnel, over a period of 30 minutes. The reaction mixture was kept at 65° C. during 3 hours. FTIR analysis indicated complete conversion. The end product was purified as follows: 500 ml ethyl acetate were added and the organic solution was washed with 200 ml HCL (1N), followed by 2 washings with 200 ml brine. The organic phase was dried over $MgSO_4$. Ethyl acetate was evaporated with water jet vacuum, using a Büchi rotary evaporator. The product was dried at 50° C. during 5 hours, using oil pump vacuum (<1 mbar). An alternative purification step included evaporation of methanol, formed during reaction, via water jet vacuum, using a Büchi rotary evaporator (up to 75° C.=<100 mm Hg). Residual methanol was further removed with oil pump vacuum (up to 80° C., =<10 mbar).

The $(HFPO)_{7.35}$-alc obtained, was a yellow coloured oil. The structure was confirmed by means of NMR.

Synthesis of (HFPO)-diol $C_3F_7O(C_3F_6O)_{5.35}CF(CF_3)C(O)NHCH_2CH_2CH_2N(CH_2CH_2OH)_2$ (HFPO)-diol was prepared starting from the corresponding (HFPO)-ester according to the following method:

To a 500 ml 3-necked flask equipped with a stir bar and reflux condenser was charged 100 g 0.0826 mol) (HFPO)-ester and 13.40 g (0.0826 mol) $H_2NCH_2CH_2CH_2N(CH_2CH_2OH)_2$. The mixture was reacted neat at 130° C. for 6 hours. From Fourier Transform Infrared Spectroscopy (FTIR) analysis, the amide —C(O)NH— was formed as the ester signal (—CO$_2$—) disappeared. The desired product, (HFPO)-diol was obtained as a viscous yellow liquid after concentration at 55° C. under aspirator vacuum.

Synthesis of Reaction Product No 1 (RP-1): 0.15 (HFPO)-alc/Des N100/0.85 SR444 (Eq. Ratio), 60% in MMA A 1 l round-bottom 3-necked flask equipped with heating mantle, mechanical stirrer, reflux condenser, thermometer and CaCl$_2$ tube was charged with 94.3 g (HFPO)-alc (0.075 eq.), 95.5 g Des N100 (0.500 eq.), 0.202 g 2,6 di t.butyl 4-methyl phenol, 269.5 g MMA and 0.202 g dibutyltin dilaurate respectively. After heating the reaction mixture for 1 hour at 75° C., 214.4 g SR444 (0.425 eq.) was added and the reaction continued for 3 hours. FT-IR indicated complete conversion. The reaction product 1 was obtained as a clear semi-viscous, 60% solution in reactive diluent.

Synthesis of Reaction Product No 2 (RP-2): Des N100/0.15 (HFPO)-alc/0.9 SR444 (Eq. Ratio); 50% in MEK A 500 ml round bottom 2-necked flask equipped with magnetic stir bar was charged with 25.00 g (0.131 eq) Des N100, 26.39 g (0.0196 eq) (HFPO)-alc and 109.62 g MEK, and was swirled to produce a homogeneous solution. The flask was placed in an 80° C. bath, charged with 2 drops of dibutyltin dilaurate catalyst, and fitted with a condenser. The reaction was cloudy at first, but cleared within two minutes. After 1.75 hours, the flask was removed from the bath and 2.42 g of MEK was added to compensate for lost solvent. A 2.0 g sample was removed from the flask, leaving (1-(2.0/161.01) or 0.9876 weight fraction, of the reaction, and 57.51 g (98.76% of 58.23 g) (0.116 mol, 494.3 equivalent weight) SR444 was added to the reaction, which was placed in a 63° C. bath. At about 5.25 hours FTIR showed no isocyanate absorption at 2273 cm$^{-1}$, and 0.56 g MEK was added to compensate for solvent lost to bring the material to 50% solids.

Synthesis of Reaction Product No 3 (RP-3): 0.6 Des N3300/ 0.2 (HFPO)-diol/0.1 (HFPO)-alc/0.3 SR444 (Eq. Ratio); 17% in C$_4$F$_9$OCH$_3$ A 240 ml bottle was charged with 5.79 g (0.03 eq) Des N3300, 6.71 g (0.01 eq) (HFPO)-diol, 6.72 g (0.005 eq) (HFPO)-alc, 7.42 g (0.015 eq) SR444, 5 drops of dibutyltin dilaurate, 87 g MEK and 20 g C$_4$F$_9$OCH$_3$ (about 20% solids) under nitrogen. The solution was reacted at 70° C. in an oil bath with a magnetic stir bar for 10 hours after sealing the bottle. Separation into two liquid phases occurred upon standing at room temperature. Addition of more C$_4$F$_9$OCH$_3$ (about 23 g) produced a clear homogeneous solution at about 17% solids. FTIR analysis showed no unreacted —NCO signal.

Synthesis of Reaction Product No 4 (RP-4): 1DesmN100/ 0.15 (HFPO)-alc/0.85 SR-444 (Eq Ratio); 33% in Ethylacetate A 240 ml bottle with a magnetic stir bar was charged with 9.55 g (50 meq.) Des N100, 9.22 g (7.5 meq.) (HFPO)-alc, 21.0 g (42.5 meq.) SR444, 80 g ethylacetate and 5 drops of dibutyltin dilaurate under nitrogen. The cloudy solution was obtained. After sealing the bottle, the reaction was done at 70° C. during 5 hours. A clear homogeneous 33% solids solution was obtained. FTIR analysis showed no unreacted —NCO signal.

Synthesis of Comparative Fluorochemical Compound (Comparative to Reaction Product (i)): (CFC-1):

(HFPO)-acryl: F(CF(CF$_3$)CF$_2$O)$_{6.85}$CF(CF$_3$)C(O) NHCH$_2$CH$_2$OCO—CH=CH$_2$ Comparative (HFPO)-acryl was prepared according to the following procedure:

In a 500 ml three necked flask fitted with a stirrer, thermometer and condenser were placed, 126.1 g (0.1 mol) of (HFPO)-alc, 60 g MEK, 60 g HFE-7200, 10.1 g (0.1 mol) triethylamine, 0.01 g MEHQ and 0.01 g phenothiazine. The mixture was cooled to 5° C. in an ice bath. Then 10.1 g (0.11 mol) acryloylchloride were added drop wise over 1 hour under nitrogen atmosphere. An exothermic reaction was noticed and precipitate was formed. The temperature was allowed to rise to 25° C. under stirring over 1 hr. The reaction was continued for 1 hr under nitrogen at 50° C. The resulting reaction mixture was washed 3 times with 200 ml of water and the organic layer was separated off.

All solvents were distilled off at 50° C. under vacuum. A clear, yellow brown liquid resulted, which was identified to be (HFPO)-acrylate.

Compound A

Compound A, capable of free radical copolymerization with reaction product (i), was prepared according to the synthesis as described in column 10, lines 24-39 (preparation 1) of U.S. Pat. No. 5,677,050.

Preparation of 50% Solids Solution of Compound A in Solvent:

A 50% solids solution in IPA was prepared by mixing 47.9 parts of the compound A with 1.2 parts Irgacure 184, 1 part Tinuvin 292, 0.02 parts BHT and 0.002 parts phenothiazine, 46.9 parts IPA and 3 parts DI water.

Preparation of 50% Solids Solution of Compound A in Reactive Diluent:

A 50% solution of compound A in reactive diluent (TPGDA) was prepared from the 50% solution of compound A in solvent as prepared above, whereby the IPA solvent was removed through distillation and replaced by TPGDA.

B. Coating and Curing Procedure

Solutions in Reactive Diluents:

Solutions are prepared comprising ingredients and amounts as given in the respective tables.

The obtained solutions were coated onto the substrates by using a K Hand Coater Bar no. 3 (available from RK Print Coat Ltd, UK) at room temperature, leaving a 24µ wet film deposited. Treated substrates were then placed on a conveyor belt coupled to a ultraviolet (UV) curing device (available from American UV Co, Murray Hill, N.Y., USA), equipped with a mercury medium pressure bulb AUV6A/300 OF and settings: 200 W/inch; 12.5 ft/min. Unless otherwise noticed, 6 passes through the UV-unit were done, which was the equivalent of 1290 mJ/cm$^2$. Curing was done under air atmosphere.

Solutions in Solvent:

Alternatively, solutions in solvent were prepared comprising ingredients in amounts as given in the respective tables. The obtained solutions were coated onto the substrates by using a K Hand Coater Bar no. 3 (available from RK Print Coat Ltd, UK) at room temperature, leaving a 24µ wet film deposited. The coatings were dried at room temperature, followed by 1 minute at 80° C. Treated substrates were then placed on a conveyor belt coupled to a ultraviolet (UV) curing device (available from American UV Co, Murray Hill, N.Y., USA) equipped with a mercury medium pressure bulb AUV6A/300 OF and settings: 200 W/inch; 20 ft/min. Again, 6 passes through the UV-unit were done. Curing was done under air atmosphere unless otherwise indicated.

C. Test Methods

Staining Test Procedure 1:

24 hours after curing, different stains were applied to substrates with or without a cured composition. The stains were applied at room temperature and included methylene blue (10% solution), red marker pen, isobetadine (brown coloured aqueous disinfectant solution), eosine (red coloured disinfectant solution), red wine, coffee and yellow coloured olive oil.

After another 24 hours the stains were removed by a soft wet or dry paper wipe, depending on the stain. The residual stain marks were visually rated on a scale from 0 (no visible mark left) to 5 (severe mark left).

Staining Test Procedure 2:

Polished marble tiles were washed with water and dried at room temperature for 24 hrs. A drop of different test fluids was put onto the tiles with or without a cured composition. After 24 hours the drops were removed by using a scrubbing and rinsing procedure with Dawn liquid dishwashing soap mixed with tap water. A scale of 0 to 5 was used to rate the spot test performance of tile surfaces with 0 representing the best rating (no visible stain) and 5 the worse rating (dark stain which has spread).

Stain Removal Test

A 4 cm diameter circular template was filled with a permanent marker. The stain was dried for 30 minutes. Stain removal was tested by rubbing for 20 seconds with a dry cotton cloth.

The stains were then visually rated on the 8 point 3M Stain Release scale with 1 indicative for completely stained and 8 indicative for no stain left.

Contact Angles

The substrates with and without cured composition according to the invention were tested for their contact angles versus water (DIW) and n-hexadecane using a Krüss DSA100 goniometer. The contact angles are reported in degrees and represent the mean values of 3 measurements.

D. Examples

Examples 1 and 2 and Reference Example Ref-1

In examples 1 and 2, a vinyl sheet was coated with a curable composition containing reaction product No 1 (RP-1), aliphatic urethane triacrylate CN998B80, aliphatic urethane diacrylate CN981, TPGDA, ethoxylated pentaerythrytol tetraacrylate SR 494, dipentaerythritol pentaacrylate SR 399 and Irgacure 184 in amounts as given in table 1. In Ref-1, a vinyl sheet was coated with the same mixture, except that no reaction product No 1 (RP-1) was added. The coated vinyl substrates were cured in air as given in the general procedure. Contact angles were measured and stain removal test was done using markers obtained from Onyx, Artline and Staedtler. The results are given in table 2

TABLE 1

Curable compositions of examples 1 and 2 and Ref-1

| Composition (%) | Example 1 | Example 2 | Ref-1 |
|---|---|---|---|
| RP-1 | 3.3 | 3.3 | 0 |
| CN998B80 | 38.9 | 39.2 | 40 |
| TPGDA | 33.9 | 34.2 | 35 |
| SR494 | 10 | 9.2 | 10 |

TABLE 1-continued

Curable compositions of examples 1 and 2 and Ref-1

| Composition (%) | Example 1 | Example 2 | Ref-1 |
|---|---|---|---|
| SR399 | 13.9 | 14.2 | 15 |
| Irg 184 | 4 | 4 | 4 |

TABLE 2

Stain removal properties of vinyl substrates

| | Contact angles (°) | | Stain removal test | | |
|---|---|---|---|---|---|
| Ex No | DIW | n-Hexadecane | Onyx marker (Ref 1891 (Black) | Artline marker 100N (blue) | Staedtler Marker 350 (blue) |
| 1 | 97 | 53 | 7 | 6 | 8 |
| 2 | 97 | 58 | 8 | 6.5 | 8 |
| Ref 1 | 68 | none | 3 | 3.5 | 4 |

Examples 3 and 4; Reference 2 (Ref-2) and Comparative Example C-1

In examples 3 and 4, residential laminate substrates, Style Promoloc, obtained from St-Maclou, were treated with curable compositions as given in table 3. In a reference example Ref-2, the substrate was treated with a curable composition without the addition of a reaction product No 1. In comparative example C-1, comparative fluorochemical compound CFC-1 was used instead of the reaction product No 1 (RP-1). Curing was done in air atmosphere according to the general procedure. After curing, contact angles were measured and stain removal test was done. The results are given in table 4.

TABLE 3 curable compositions of examples 3 and 4

| Composition (%) | Ex 3 | Ex 4 | Ref-2 | C-1 |
|---|---|---|---|---|
| RP-1 | 3.3 | 3.3 | 0 | 0 |
| CN981 | 38.9 | 39.2 | 40 | 39.5 |
| TPGDA | 33.9 | 34.2 | 35 | 34.5 |
| SR494 | 10 | 9.2 | 10 | 9.5 |
| SR399 | 13.9 | 14.2 | 15 | 14.5 |
| Comp FC-1 | 0 | 0 | 0 | 2 |
| Irg 184 | 4 | 4 | 4 | 4 |

TABLE 4 properties of laminate comprising cured composition

| | Contact angles (°) | | Stain removal test | | |
|---|---|---|---|---|---|
| Ex No | DIW | n-Hexadecane | Onyx marker | Artline marker | Staedtler Marker |
| 3 | 107 | 61 | 8 | 7 | 8 |
| 4 | 105 | 64 | 7.5 | 7.5 | 8 |
| Ref 2 | 72 | none | 3 | 3 | 2.5 |
| C-1 | 100 | 70 | 6.5 | 6 | 7 |

Examples 5 to 8 Comparative Examples C-2 to C-5 and References Ref 3 to Ref 6

For examples 5 to 8, different substrates were coated with a curable composition prepared from 10 g Compound A (50% in solvent IPA), 0.1 g reaction product No 2 (RP-2), 0.8 g IPA and 5.8 g MEK. For comparative examples C-2 to C-5, the corresponding substrates were coated with a curable composition containing 10 g Compound A (50% in solvent IPA), 0.1 g CFC-1, 0.8 g IPA and 5.8 g MEK. Coating and curing were done according to the general procedure. The substrates comprising a cured coating as well as untreated substrates (Ref 3 to Ref 6) were tested for staining performance using the staining test procedure 1. The results are given in tables 5 to 8.

TABLE 5

Staining test performance of unglazed and polished "porcelanico" ceramic tiles:

| Stain | Example 5 | C-2 | Ref 3 (untreated) |
|---|---|---|---|
| Red marker pen | 0 | 2 | 5 |
| Methylene blue | 0 | 2 | 5 |
| Isobetadine | 0 | 1 | 4 |
| Olive oil | 0 | 1 | 4 |
| Eosine | 0 | 1 | 5 |
| Red wine | 0 | 1 | 4 |
| Coffee | 0 | 1 | 3 |

TABLE 6

Staining test performance of treated and untreated unglazed and unpolished "porcelanico" ceramic tiles

| Stain | Example 6 | C-3 | Ref 4 (untreated) |
|---|---|---|---|
| Red marker pen | 0 | 3 | 5 |
| Methylene blue | 0 | 3 | 5 |
| Isobetadine | 0 | 1 | 4 |
| Olive oil | 0 | 1 | 3 |
| Eosine | 0 | 2 | 4 |
| Red wine | 0 | 2 | 4 |
| Coffee | 0 | 1 | 3 |

TABLE 7

Staining test performance of treated and untreated glazed ceramic tiles

| Stain | Example 7 | C-4 | Ref 5 (untreated) |
|---|---|---|---|
| Red marker pen | 0 | 1 | 4 |
| Methylene blue | 0 | 1 | 1 |

TABLE 8

Staining test performance of treated and untreated marble tiles

| Stain | Example 8 | C-5 | Ref 6 (untreated) |
|---|---|---|---|
| Red marker pen | 0 | 2 | 5 |
| Methylene blue | 0 | 2 | 5 |
| Isobetadine | 0 | 1 | 4 |
| Olive oil | 0 | 2 | 4 |
| Eosine | 0 | 2 | 5 |
| Red wine | 0 | 2 | 5 |
| Coffee | 0 | 2 | 4 |

Examples 9 and 10 and Reference Ref 7

For example 9 polished marble tiles were coated with a curable composition prepared from 10 g Compound A (50% in solvent IPA), 0.6 g reaction product No 3 (RP-3), 10.2 g IPA and 5.4 g MEK. For example 10 polished marble tiles were coated with a curable composition prepared from 10 g Compound A (50% in solvent IPA), 0.307 g reaction product No 4 (RP-4), 11 g IPA and 5.6 g ethylacetate. Coating and curing were done according to the general procedure, but under nitrogen atmosphere. The substrates comprising a cured coating as well as untreated substrates (Ref 7) were tested for staining performance according to the staining test procedure 2 and using following stains: used 10W30 motor oil, Pennzoil ATF Automatic Transmission Fluid, Grape Juice and coffee.

For the tiles of examples 9 and 10, having a cured composition, a value of 0 was recorded for all stains. For the untreated tiles, a value of 5 was recorded for all stains.

Various modifications and alterations to this invention will become apparent to those skilled in the art without departing from the scope and spirit of this invention.

The invention claimed is:

1. Flooring substrate comprising a coating of a curable composition, said curable composition comprising:
   (i) a reaction product of (i) a polyisocyanate, (ii) one or more perfluoropolyether compounds having at least one hydroxyl group and (iii) an organic compound having one or more free radical polymerizable groups and at least one hydroxyl group;
   (ii) a compound capable of free radical copolymerization with said reaction product and comprising at least two free radical polymerizable groups.

2. Flooring substrate according to claim 1 wherein said free radical polymerizable groups in said reaction product and said free radical polymerizable groups of said compound capable of free radical copolymerization with said reaction product are selected from the group consisting of acrylic and methacrylic groups.

3. Flooring substrate according to any of the previous claims wherein said polyisocyanate comprises a tri-isocyanate.

4. Flooring substrate according to any of the previous claims wherein said one or more perfluoropolyether compounds have only one hydroxyl group.

5. Flooring substrate according to any of the previous claims wherein at least one of said perfluoropolyether compounds corresponds to the general formula:

PF-Q-(OH)$_b$ wherein PF represents a perfluoropolyether group, b is 1 or 2 and Q represents a linking group.

6. Flooring substrate according to claim 1 wherein said perfluoropolyether group corresponds to the formula:

F(CF(CF$_3$)CF$_2$O)$_a$CF(CF$_3$)— wherein a is at least 3.

7. Flooring substrate according to claim 1 wherein the coating is free of or substantially free of organic solvents.

8. Flooring substrate comprising a coating comprising a cured composition obtained by curing a curable composition as defined in any of the previous claims.

9. Flooring substrate according to any of the claims 1 to 8 wherein said flooring substrate is a non-porous flooring substrate.

10. Flooring substrate according to claim 9 wherein said non-porous flooring substrate is selected from the group consisting of ceramic substrates, wood, laminate, vinyl, rubber, marble and linoleum.

11. Flooring substrate according to claim 1 wherein said compound capable of free radical copolymerization with said reaction product is not covalently attached to said reaction product.

12. Method comprising (i) providing a flooring substrate as defined in any of claims 1 to 7 and (ii) causing said flooring substrate to cure.

13. Method according to claim 12 wherein said flooring substrate is caused to cure in the presence of air.

* * * * *

UNITED STATES PATENT AND TRADEMARK OFFICE
CERTIFICATE OF CORRECTION

PATENT NO. : 7,722,955 B2
APPLICATION NO. : 11/279657
DATED : May 25, 2010
INVENTOR(S) : Frans Audenaert It is certified that error appears in the above-identified patent and that said Letters Patent is hereby corrected as shown below:

Column 4
Line 33-34; Delete "azetedinedione" and insert -- azetedienedione --, therefor.

Column 6
Line 24; Delete "solubilise" and insert -- solubilize --, therefor.

Column 7
Line 19; Delete "hydroxypivalaldehyde" and insert -- hydroxypivaldehyde --, therefor.

Column 15
Line 48; Delete "pentaerythrytol" and insert -- pentaerythritol --, therefor.
Line 56; After "table 2" insert -- . --.

Signed and Sealed this
First Day of January, 2013

David J. Kappos
*Director of the United States Patent and Trademark Office*